United States Patent [19]

Charng

[11] Patent Number: 5,331,712
[45] Date of Patent: Jul. 26, 1994

[54] WINDSHIELD-WIPER ASSEMBLY WITH AIR DEFLECTOR

[75] Inventor: Cedric S. K. Charng, Taipei, Taiwan

[73] Assignee: China Wiper Special Rubber Co., Ltd., Taipei, Taiwan

[21] Appl. No.: 543,136

[22] Filed: Jun. 22, 1990

[30] Foreign Application Priority Data

Jan. 22, 1990 [GB] United Kingdom ............ 9001392.1

[51] Int. Cl.$^5$ .......................... B60S 1/28; B60S 1/04
[52] U.S. Cl. .......................... 15/250.41; 15/250.20; 15/250.42
[58] Field of Search .......... 15/250.20, 250.42, 250.36, 15/250.41, 250.37, 250.38, 250.39, 250.40

[56] References Cited

U.S. PATENT DOCUMENTS

| | | | |
|---|---|---|---|
| 2,799,887 | 7/1957 | Nemic | 15/250.20 |
| 3,317,946 | 5/1967 | Anderson | 15/250.32 |
| 3,673,631 | 7/1972 | Yamadai et al. | 15/250.42 |
| 3,939,524 | 2/1976 | Knights | 15/250.20 |
| 3,942,212 | 3/1976 | Steger et al. | 15/250.42 |
| 4,180,885 | 1/1980 | Thornton et al. | 15/250.42 |
| 4,628,565 | 12/1986 | Wolters | 15/250.42 |
| 4,852,206 | 8/1989 | Fisher | 15/250.42 |

FOREIGN PATENT DOCUMENTS

| | | | |
|---|---|---|---|
| 1480094 | 4/1970 | Fed. Rep. of Germany ... | 15/250.42 |
| 3004478 | 3/1986 | Fed. Rep. of Germany . | |
| 1296311 | 5/1962 | France | 15/250.42 |
| 838316 | 6/1960 | United Kingdom . | |
| 1040936 | 9/1966 | United Kingdom | 15/250.42 |
| 2030447 | 4/1980 | United Kingdom | 15/250.42 |
| 2145928 | 4/1985 | United Kingdom . | |
| 2146891 | 5/1985 | United Kingdom . | |
| 2168243 | 6/1986 | United Kingdom . | |
| 2195076 | 3/1988 | United Kingdom . | |

Primary Examiner—Stephen F. Gerrity
Assistant Examiner—Gary K. Graham
Attorney, Agent, or Firm—Herbert Dubno; Andrew Wilford

[57] ABSTRACT

A wiper blade assembly for mounting on the end of a wiper arm and engaging a windshield has a main yoke generally pivoted at a central pivot on the wiper arm and having a pair of outer ends, respective upper and lower secondary yokes pivoted at outer axes on the outer ends of the main yoke and having inner and outer ends, and respective tertiary yokes pivoted on the outer ends of the secondary yokes. The tertiary yokes have inner and outer ends formed as blade holders and the inner ends of the secondary yokes are also formed as blade holders. A wiper blade carried in the holders and engageable against a windshield. An outer wind-deflecting aerodynamic vane is carried on each secondary yoke between the respective outer end and the respective outer pivot and an inner wind-deflecting aerodynamic vane is carried on each secondary yoke between the respective inner end and the respective outer pivot.

8 Claims, 2 Drawing Sheets

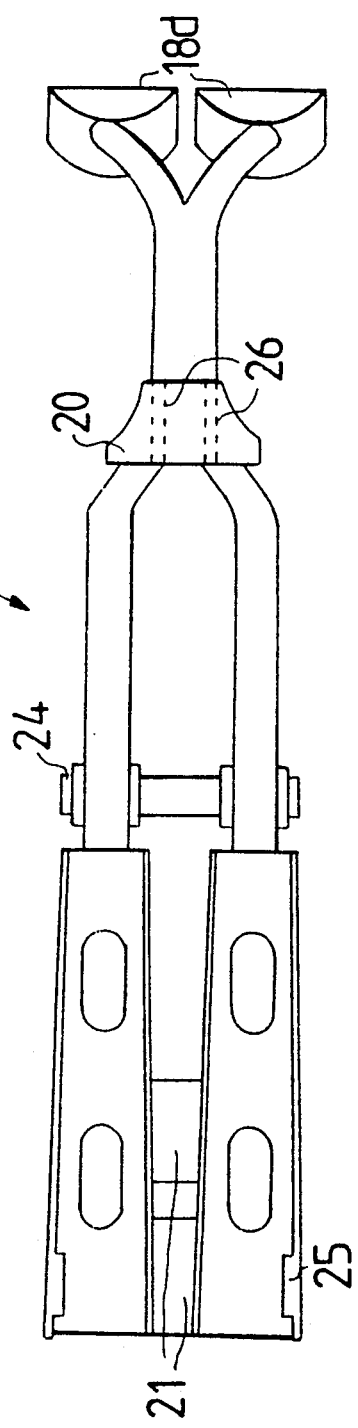

WINDSHIELD-WIPER ASSEMBLY WITH AIR DEFLECTOR

FIELD OF THE INVENTION

The present invention relates to a windshield-wiper assembly. More particularly this invention concerns such an assembly provided with an air deflector.

BACKGROUND OF THE INVENTION

A standard windshield wiper is comprised of a wiper arm normally pivoted at a lower end at the base of the windshield about an axis perpendicular to the longitudinal axis of the wiper arm and an upper end on which a blade assembly is pivoted about an axis perpendicular to a plane including the lower-end pivot axis and wiper-arm longitudinal axis. The assembly itself comprises a main yoke pivoted on the upper end of the wiper arm and normally extending generally parallel to the wiper arm. Upper and lower secondary yokes are pivoted to upper and lower ends of the main yoke and upper and lower tertiary yokes are frequently pivoted on the upper and lower ends of the secondary yokes and also in particularly long setups on the lower and upper ends of the upper and lower secondary yokes, respectively, it being noted that the terms "upper" and "lower" are here used relatively only and respectively refer to being distal or proximal, respectively, from the axis at which the wiper arm is pivoted on the vehicle. The ends of the tertiary yokes, and also normally the upper and lower ends of the lower and upper secondary yokes, are formed as claws that engage around a backing strip that in turn carries an elastomeric wiper blade. The main yoke may carry two such pairs of secondary yokes carrying respective tertiary yokes for carrying two such backing strips and blades.

A problem at high vehicle speed is that the air moving over the windshield can in effect get under the wiper blade assembly and lift it from the windshield, reducing the wiping effect. Accordingly it is known, for example from German patent document 3,004,478 to incorporate one or more air deflector members in the central main yoke of the blade assembly so that as the velocity of the moving air stream increases, the force with which the assembly is pressed down on the windscreen is also increased. However, this known method does not take account of the likely variation in pressures generated on the wiper blade by the secondary and/or tertiary yokes and although some overall improvement can be expected by the use of air deflector members on the main yoke, such use has not, thus far, solved the problem of securing good end-to-end wiping performance on a range of different windshield profiles over a range of different moving air stream configurations.

OBJECTS OF THE INVENTION

It is therefore an object of the present invention to provide an improved wiper blade assembly.

Another object is the provision of such an improved wiper blade assembly which overcomes the above-given disadvantages, that is which ensures good end-to-end wiping characteristics even at very high speeds.

SUMMARY OF THE INVENTION

A wiper blade assembly for mounting on the upper end of a wiper arm and engaging a windshield according to this invention has a main yoke generally pivoted at a central pivot on the wiper arm and having a pair of outer ends, respective upper and lower secondary yokes pivoted at outer axes on the outer ends of the main yoke and having inner and outer ends, and respective tertiary yokes pivoted on the outer ends of the secondary yokes. The tertiary yokes have inner and outer ends formed as blade holders and the inner ends of the secondary yokes are also formed as blade holders. A wiper blade carried in the holders is engageable against a windshield. An outer wind-deflecting aerodynamic vane is carried on each secondary yoke between the respective outer end and the respective outer pivot and an inner wind-deflecting aerodynamic vane is carried on each secondary yoke between the respective inner end and the respective outer pivot.

Thus according to this invention the aerodynamic effect, whether set to press the blade down or lift it from the windshield, is set right at the secondary yoke. As a result the blade is not simply pressed down from the middle as in the prior-art systems, with little of this force being transmitted to end regions of the wiper blade; instead it is pressed down all along its length for best wiping action.

Each vane according to this invention is of airfoil cross section so that the aerodynamic action can be tailored to exactly what is needed providing, if desired, a measured lift. Furthermore each such vane has an inner edge proximal to the central pivot and an outer edge distal thereto. The vanes are inclined with the inner edges closer to the windshield than the outer edges. This causes the oncoming air to press the outer ends of the blade down onto the windshield.

In accordance with further features of this invention each secondary yoke is at least partially bifurcated into two parts to one side of the respective outer axis and at least one of the vanes bridges the bifurcated parts. Furthermore the one secondary yoke is provided with at least one fin supporting the respective vane up away from the windshield and at least one of the vanes is adjustable. At least one tertiary yoke is provided on a respective end of each secondary yoke and the blade is directly engaged by the tertiary yokes.

DESCRIPTION OF THE DRAWING

The above and other objects, features, and advantages will become more readily apparent from the following, reference being made to the accompanying drawing in which:

FIG. 2 is a top view, partly broken away and in section, of a secondary yoke in accordance with the invention;

FIG. 3 is a side view of the detail of FIG. 2;

FIG. 4 is a longitudinal section through the detail of FIG. 2; and

FIG. 5 is a top view of a tertiary yoke in accordance with the invention.

SPECIFIC DESCRIPTION

Figure 1:
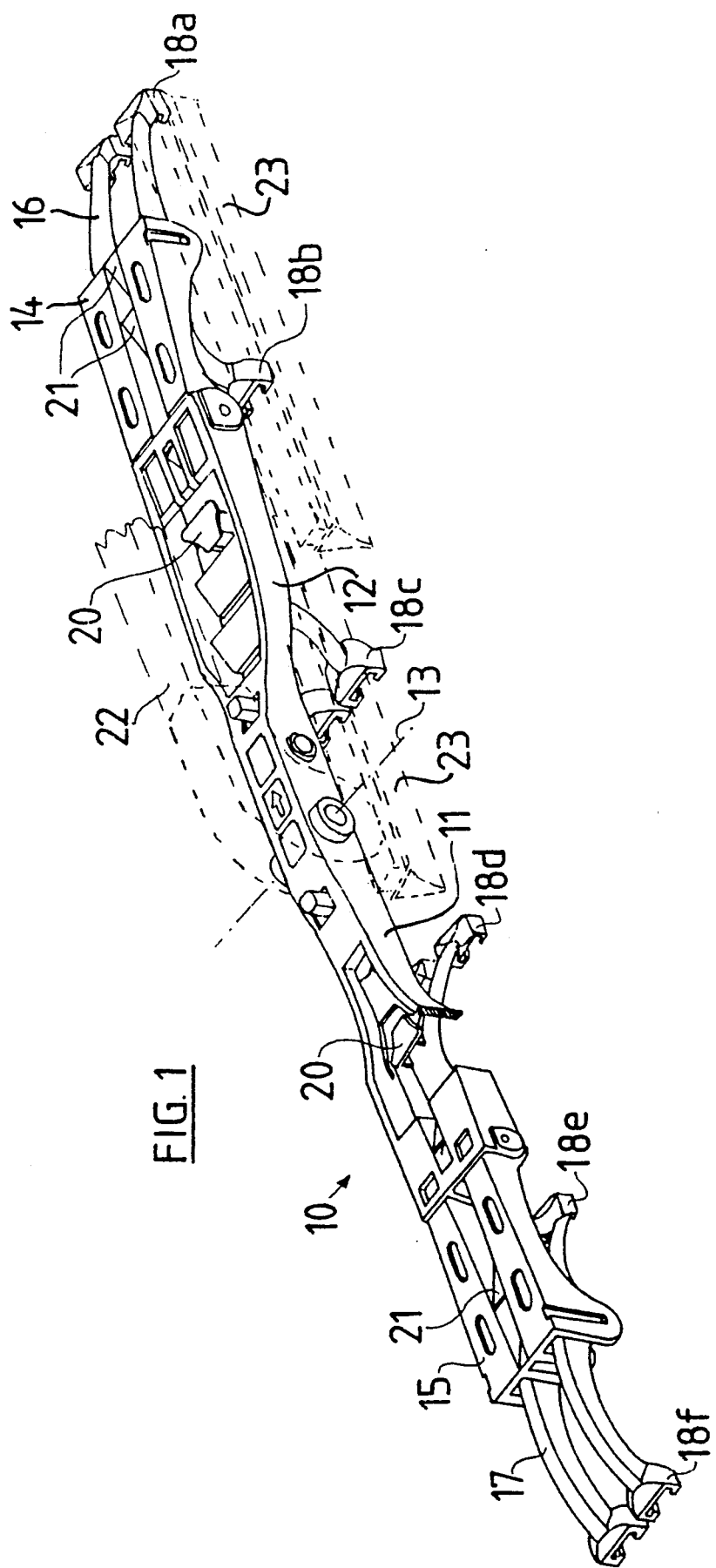
FIG. 1 is perspective view of a wiper-blade assembly according to this invention.

As seen in FIG. 1, a blade assembly 10 is carried on a wiper arm indicated in dashed lines at 22 and carries wiper blades indicated similarly in dashed lines at 23. This assembly 10 is pivoted to a central region 11 of a central main yoke portion 12, to the wiper arm 22. The actual linkage does not constitute a part of this invention and accordingly can be of any suitable conventional design. It allows relative pivoting of the assembly 10 on the arm 22 about an axis 13 transverse to both the arm 22 and assembly 10.

Attached at transverse inner pivots 24 to the yoke portion 12 are lower and upper secondary yokes 14 and 15 (see FIGS. 2–4) and pivotally attached at outer pivots parallel to the pivots 24 to the lower and upper ends of the secondary yokes 14 and 15 are respective lower and upper tertiary yokes 16 and 17 (see FIG. 5). The yokes 14 through 17 form six pairs of wiper attachment claws 18a, 18b, 18c, 18d, 18e, and 18f each capable of gripping a supporting channel member of one of two identical wiper blades 23. The design and mode of operation of the claws 18a-f to support a blade 23 mounted in a channel member will not be further discussed since they can also be conventional and these features are not central to the present invention. The two outermost claws 18a and 18f engage the wiper blade 23 adjacent its lower and upper ends so that the other four claws 18 engage the wiper support member at roughly 20%, 40%, 60% and 80% along its length.

To utilize the air flows that move past the assembly 10 in normal use to advantage, each secondary yoke 14 and 15 has an elevated wing member or vane 20 mounted to the inner side, that is its side toward the central pivot 13, of its central pivot 24 and a pair of angled air deflectors 21 located to the outer side of the pivot 24 of the secondary yoke 14 and 15 to the main yoke 12. The vanes 20 are supported on small fins 26 on the yokes 14 and 15 in line with respective apertures formed in the main yoke 12 and the vanes 21 bridge the sides of these yokes. In this way the reaction caused by the air on the wing members and air deflectors of the secondary yokes generates a force which modifies how the wiper blades are urged against the windshield. As shown in the drawings, each wing member 20 and 21 acts to increase the force exerted by the adjacent claw 18 on the respective wiper blade but this is not necessarily the best arrangement and it is not ruled out that an airfoil shape leading to a reduced pressure with increasing air speed may be desirable at some location in some circumstances. In this application each vane 20 or 21 is tipped at an angle α of 15° to the longitudinal axis of the assembly 10, with an inner edge, that is an edge closer to the central crosswise axis 13, that is further from the windshield than an outer edge. As a result the air flowing in the direction indicated by arrows A in FIG. 4 will serve to press the ends of the yokes 14 and 15 down on the windshield. It will be appreciated that the air flow conditions in use are complex and will involve air flows which deflect off the windshield and air flows which "slip" over the windshield.

Although not shown, one or more further wing members and/or air deflectors may be mounted on each tertiary yoke 16 and 17 to further enhance the aerodynamic effect.

As can be seen from the drawings there are a number of novel design features associated with the wiper blade assembly described herein. For example the main yoke portion 12 is designed so that the elevated wing members 20 are received between unobstructed spaced apart side walls of the main yoke 12. Thus in use air is able to flow between these spaced apart walls and to act directly on the wing members 20. Each secondary yoke 14 and 15 is of generally bifurcated form, the bifurcations thereof being joined by the air deflectors 21. If an elevated wing member is provided on each tertiary yoke it can be located in use between these bifurcations. Since there are no connecting webs between the bifurcations to obstruct air flows, any air flowing between the bifurcations is able to act directly on the wing member.

The drawing shows a wiper blade assembly for twin wiper blades but it is within the scope of the invention to provide only a single blade or more than two parallel blades.

I claim:

1. A wiper blade assembly for mounting on an end of a wiper arm and engaging a windshield, the assembly comprising:
   an elongated main yoke generally pivotable at a central pivot on the wiper arm and having a pair of outer ends each formed with a throughgoing aperture;
   respective secondary yokes pivoted at outer axes on the outer ends of the main yoke and having inner ends underlying the respective apertures and outer ends;
   mounting means on the secondary-yoke ends for carrying a wiper blade engageable against a windshield; and
   at least one wind-deflecting aerodynamic vane carried on at least one of the secondary yokes at the inner end thereof in line with the respective apertures, the one secondary yoke being provided with at least one fin supporting the respective vane up away from the one secondary yoke, whereby airflow through the aperture can directly contact the vane.

2. The wiper blade assembly defined in claim 1 wherein each vane is of airfoil cross section.

3. The wiper blade assembly defined in claim 1 wherein each secondary yoke is provided with one such vane.

4. The wiper blade assembly defined in claim 3 wherein each such vane has an inner edge proximal to the central pivot and an outer edge distal thereto, the vanes being inclined with the inner edges closer to the windshield than the outer edges.

5. The wiper blade assembly defined in claim 1 wherein each secondary yoke is at least partially bifurcated into two parts outward of the respective outer axis and is formed with at least one outer vane bridging the respective bifurcated parts.

6. The wiper blade assembly defined in claim 1 wherein the means includes at least one tertiary yoke on a respective end of each secondary yoke, the blade being directly engaged by the tertiary yokes.

7. A wiper blade assembly for mounting on an end of a wiper arm and engaging a windshield, the assembly comprising:
   an elongated main yoke pivoted at a central pivot on the wiper arm and having a pair of outer ends each formed with a throughgoing aperture;
   respective upper and lower secondary yokes pivoted at outer axes on the outer ends of the main yoke and having inner ends underlying the respective apertures and outer ends;
   respective tertiary yokes pivoted on the outer ends of the secondary yokes, the tertiary yokes having inner and outer ends formed as blade holders and the inner ends of the secondary yokes also being formed as blade holders;
   a wiper blade carried in the holders and engageable against a windshield;

an outer wind-deflecting aerodynamic vane carried on each secondary yoke between the respective outer end and the respective outer pivot;

at least one fin on each secondary yoke between the respective inner end and the respective outer pivot; and an inner wind-deflecting aerodynamic vane supported by the respective fin up away from each secondary yoke between the respective inner end and the respective outer pivot and aligned directly with the respective main-yoke aperture.

8. The wiper blade assembly defined in claim 7 wherein the holders are provided in tandem and two such wiper blades extending parallel to each other are held by the holders.

* * * * *